US012559383B2

(12) United States Patent
Armstrong et al.

(10) Patent No.: US 12,559,383 B2
(45) Date of Patent: Feb. 24, 2026

(54) SURFACE-MODIFIED TRANSITION METAL OXIDE NANOPARTICLES, METHOD OF MAKING THE SAME, AND CURABLE COMPOSITION AND ARTICLE INCLUDING THE SAME

(71) Applicant: 3M INNOVATIVE PROPERTIES COMPANY, St. Paul, MN (US)

(72) Inventors: Paul B. Armstrong, St. Paul, MN (US); Bryan V. Hunt, Nowthen, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 431 days.

(21) Appl. No.: 18/016,779

(22) PCT Filed: Aug. 6, 2021

(86) PCT No.: PCT/IB2021/057273
§ 371 (c)(1),
(2) Date: Jan. 18, 2023

(87) PCT Pub. No.: WO2022/043805
PCT Pub. Date: Mar. 3, 2022

(65) Prior Publication Data
US 2023/0286824 A1 Sep. 14, 2023

Related U.S. Application Data

(60) Provisional application No. 63/070,957, filed on Aug. 27, 2020.

(51) Int. Cl.
| | |
|---|---|
| *C01G 23/08* | (2006.01) |
| *C08K 3/22* | (2006.01) |
| *C09D 7/62* | (2018.01) |

(52) U.S. Cl.
CPC ................ *C01G 23/08* (2013.01); *C08K 3/22* (2013.01); *C09D 7/62* (2018.01); *C01P 2004/64* (2013.01); *C08K 2003/2241* (2013.01)

(58) Field of Classification Search
CPC . C01G 23/08; C09D 7/62; C08K 3/22; C08K 2003/2241; C01P 2004/64;
(Continued)

(56) References Cited

U.S. PATENT DOCUMENTS

| | | |
|---|---|---|
| 7,547,467 B2 | 6/2009 | Olson et al. |
| 8,829,079 B2 | 9/2014 | Shultz et al. |

(Continued)

FOREIGN PATENT DOCUMENTS

| | | |
|---|---|---|
| CN | 102639432 A | 8/2012 |
| CN | 103003365 A | 3/2013 |

(Continued)

OTHER PUBLICATIONS

Colombo, Annalisa. "Synthesis and characterization of TiO2 polymeric nanocomposites with tailorable optical properties." (2012).*
(Continued)

*Primary Examiner* — Richard M Rump
(74) *Attorney, Agent, or Firm* — Carolyn A. Fischer

(57) ABSTRACT

A method of making surface-functionalized transition metal oxide nanoparticles comprises: providing a sol comprising transition metal oxide nanoparticles dispersed in an aqueous liquid medium having a pH of less than or equal to 3.5, combining the sol with an extractant composition comprising at least one carboxylic acid and at least one organic amine, and a water-immiscible organic solvent, and separating at least a portion of the organic phase from the aqueous phase and then at least partially removing the water-immiscible organic solvent. The carboxylic acid has from 6 to 30 atoms. The organic amine is represented by the
(Continued)

formula R2R3NH, wherein R2 is a hydrocarbyl group having from 6 to 30 carbon atoms, and R3 is H or an alkyl group having from 1 to 4 carbon atoms. The at least one organic amine is present in an amount sufficient raise the pH to at least 5, thereby forming discrete separable aqueous and organic phases. A surface-modified nanoparticle composition, a curable composition and an article comprising the same are also disclosed.

19 Claims, 1 Drawing Sheet

(58) Field of Classification Search
CPC ................... B01J 21/063; B01J 21/066; B01J 2523/0712; B01J 2523/47; B01J 2523/48
See application file for complete search history.

(56) References Cited

U.S. PATENT DOCUMENTS

| | | | |
|---|---|---|---|
| 9,006,354 | B2 | 4/2015 | Otsuka et al. |
| 9,150,698 | B2 | 10/2015 | Otsuka et al. |
| 9,669,375 | B2 | 6/2017 | Prok et al. |
| 11,034,843 | B2 | 6/2021 | Hartmann-Thompson et al. |
| 2007/0112097 | A1 | 5/2007 | Olson et al. |
| 2010/0270238 | A1 | 10/2010 | Jang et al. |
| 2011/0126734 | A1 | 6/2011 | Joly et al. |
| 2016/0049610 | A1 | 2/2016 | Harkema et al. |
| 2018/0265372 | A1 | 9/2018 | Yao et al. |

FOREIGN PATENT DOCUMENTS

| | | |
|---|---|---|
| CN | 105210208 A | 12/2015 |
| FR | 2895277 A1 | 6/2007 |
| FR | 3067948 A1 | 12/2018 |
| FR | 3067949 A1 | 12/2018 |
| JP | 2005-194148 A | 7/2005 |
| WO | 2007077357 A2 | 7/2007 |
| WO | 2011/068697 A2 | 6/2009 |
| WO | 2009147025 A2 | 12/2009 |
| WO | 2010/085427 A1 | 7/2010 |
| WO | 2013085062 A1 | 6/2013 |
| WO | 2013116300 A2 | 8/2013 |
| WO | 2013177512 A1 | 11/2013 |

OTHER PUBLICATIONS

Babiarczuk, Bartosz, et al. "The influence of an acid catalyst on the morphology, wettabillity, adhesion and chemical structure properties of TiO2 and ZrO2 sol-gel thin films." Surface and Coatings Technology 285 (2016): 134-145.*

Hou, Yue, et al. "Biphasic liquid interface derived magnetite nanocrystals: synthesis, properties and growth mechanism." Materials Research Express 4.12 (2017): 125028.*

Mandel, K., et al. "Synthesis and stabilisation of superparamagnetic iron oxide nanoparticle dispersions." Colloids and Surfaces A: Physicochemical and Engineering Aspects 390.1-3 (2011): 173-178.*

Enomoto, "Unique Hydrophobization And Hybridization via Direct Phase Transfer of ZrO2 Nanoparticles from Water to Toluene Producing Highly Transparent Polystyrene and Poly(methyl methacrylate) Hybrid Bulk Materials", Macromolecules, 2017, vol. 50, pp. 9713-9725.

International Search Report for PCT International Application No. PCT/IB2021/057273, mailed on Nov. 8, 2021, 6 pages.

Karapati, "TiO2 Functionalization For Efficient NOx Removal In Photoactive Cement", Applied Surface Science, 2014, vol. 319, pp. 29-36.

Nakayama, "Preparation of TiO2 Nanoparticles Surface-Modified By Both Carboxylic Acid And Amine: Dispersibility And Stabilization In Organic Solvent", Colloids and Surfaces A: Physicochemical and Engineering Aspects, 2008, vol. 317, No. 01-03, pp. 543-550.

Pauly, "Simultaneous Phase Transfer and Surface Modification of TiO2 Nanoparticles Using Alkylphosphonic Acids: Optimization and Structure of the Organosols", Langmuir, American Chemical Society, 2015, vol. 31, pp. 10966-10974.

Qu, "Chemically Binding Carboxylic Acids onto TiO2 Nanoparticles with Adjustable Coverage by Solvothermal Strategy", Langmuir, American Chemical Society, 2010, vol. 26, No. 12, pp. 9539-9546.

Roo, "Unravelling the Surface Chemistry of Metal Oxide Nanocrystals, The Role of Acids And Bases", Journal Of The American Chemical Society, 2014, vol. 136, pp. 9650-9657.

Nakayama, et al., "Preparation and Characterization of TiO2 and Polymer Nanocomposite Films with High Refractive Index", Journal of Applied Polymer Science, vol. 105, (2007), pp. 3662-3672.

* cited by examiner 120
110
100
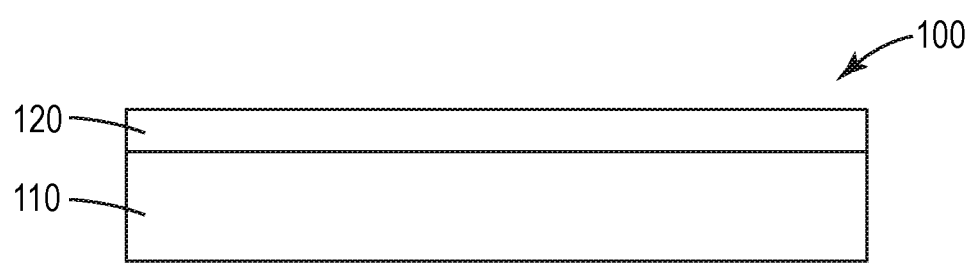

SURFACE-MODIFIED TRANSITION METAL OXIDE NANOPARTICLES, METHOD OF MAKING THE SAME, AND CURABLE COMPOSITION AND ARTICLE INCLUDING THE SAME

BACKGROUND

Metal oxide nanoparticles, especially titania or zirconia nanoparticles, are used to increase the refractive index (RI) of coatings and composites. Typically, the nanoparticles are synthesized in water and are stabilized by inorganic acids or bases. For example, acidic nanoparticle sols may contain nitric acid, hydrochloric acid, or acetic acid. Basic sols may contain ammonium hydroxide or tetramethylammonium hydroxide. To use metal oxide nanoparticles in coatings, the particles must typically be surface-modified to improve their compatibility with desirable resins, such as acrylates or polymers.

U.S. Pat. No. 8,829,079 (Shultz et al.) discloses a process for preparing carboxylic acid-acid stabilized zirconia nanoparticle sols. To surface modify the particles, the carboxylic acid as well as a water-miscible solvent is added. Water plus an excess carboxylic acid (e.g., formic acid, acetic acid) are then removed. The surface-modified nanoparticles can be combined with acrylic monomers to yield a 100% solids nanocomposite precursor.

In some applications, it is desirable to employ nanoparticles with a Refractive Index (RI) higher than zirconia. For instance, anatase titania has an RI of 2.49 ($\eta_D$), which enables composites with a higher refractive index than zirconia (RI=2.13, $\eta_D$).

Commercial titania nanoparticles are often stabilized by strong acid. For instance, titania nanoparticles stabilized with nitric acid are available from Nyacol Nanotechnologies, Ashland, Massachusetts, and titania nanoparticles stabilized with hydrochloric acid are available from Showa Denko, Tokyo, Japan.

SUMMARY

The above-described surface functionalization method employed for carboxylic acid-stabilized zirconia particles will not work with the foregoing titania particles because a weakly acidic carboxylic acid cannot displace a strong mineral acid on the particle surface. For titania nanoparticles that are stabilized with strong acid, a new surface functionalization method is needed.

The present disclosure solves this problem by using a surface functionalization by an extraction method. Acid-stabilized aqueous nanoparticles are treated with an organic solvent (immiscible with water), a carboxylic acid, and an excess of an alkylamine. The alkylamine neutralizes the strong mineral acid and deprotonates the alkanecarboxylic acid. The resulting alkanecarboxylates then bind to the nanoparticle surfaces, which renders the particles hydrophobic and results in their transfer to the organic phase so the nanoparticles can be readily isolated. Salt byproducts remain in the aqueous phase and are easily removed. The solvent-dispersed particles have improved compatibility with monomers or polymers and can therefore be used to make high refractive index coatings and composites.

Accordingly, in one aspect, the present disclosure provides a method of making surface-functionalized nanoparticles, the method comprising:

providing a sol comprising transition metal oxide nanoparticles dispersed in an aqueous liquid medium having a pH of less than or equal to 3.5 and stabilized with at least one mineral acid;

combining the sol with an extractant composition comprising at least one carboxylic acid and at least one organic amine, and a water-immiscible organic solvent, wherein:

each one of the at least one carboxylic acid is independently represented by the formula $R^1$—$CO_2H$, wherein $R^1$ is a hydrocarbyl group having from 6 to 30 carbon atoms; and each one of the at least one organic amine is represented by the formula $R^2R^3NH$, wherein $R^2$ is a hydrocarbyl group having from 6 to 30 carbon atoms, and $R^3$ is H or an alkyl group having from 1 to 4 carbon atoms, and wherein the at least one organic amine is present in at least an amount sufficient to neutralize acid present in the sol, thereby forming discrete separable aqueous and organic phases; and separating at least a portion of the organic phase from the aqueous phase and then at least partially removing the water-immiscible organic solvent to obtain at least a portion of the surface-functionalized transition metal oxide nanoparticles.

In another aspect, the present disclosure provides a surface-modified nanoparticle composition comprising surface-functionalized transition metal oxide nanoparticles, each comprising a respective transition metal oxide core having a surface layer thereon comprising bound organic carboxylates represented by the formula $R^1$—$CO_2^-$, wherein $R^1$ is a hydrocarbyl group having from 6 to 30 carbon atoms, and at least one organoammonium cation represented by the formula $R^2R^3NH_2^+$, wherein $R^2$ represents a hydrocarbyl group having from 6 to 30 carbon atoms, and $R^3$ represents H or an alkyl group having from 1 to 4 carbon atoms.

In yet another aspect, the present disclosure provides a curable composition comprising a surface-modified nanoparticle composition according to the present disclosure, at least one curable monomer, and curative. The curable composition can be used to produce a nanocomposite layer on a substrate.

Accordingly, in yet another aspect, the present disclosure provides an article comprising a substrate having a layer of an at least partially cured curable composition according to the present disclosure disposed thereon.

As used herein:

The term "aqueous" means containing at least 20 percent by weight of water; in some cases, at least 30, at least 40, at least 50, at least 60, at least 70, at least 80, at least 90, or even at least 99 percent by weight of water.

The term hydrocarbyl refers to a monovalent organic group consisting of carbon and hydrogen.

The term "immiscible" means incapable of being mixed to form a homogenous mixture.

The term "mineral acid" refers to an inorganic acid.

The term "nanoparticle" refers to particles having a volume average diameter of 100 nanometers or less.

The term "sol" refers to a stable colloidal dispersion.

The term "strong acid" refers to an acid that completely dissociates in water at 25° C. and 1 atm (101 kPa) pressure. Inorganic strong acids include hydroiodic acid, hydrobromic acid, hydrochloric acid, perchloric acid, chloric acid, sulfuric (1) acid, and nitric acid.

The term "transitional metal" refer to metals in Groups 3 through 12 of the IUPAC Periodic Table of the Elements, and includes Lanthanides and Actinides.

Features and advantages of the present disclosure will be further understood upon consideration of the detailed description as well as the appended claims.

BRIEF DESCRIPTION OF THE DRAWINGS

FIG. 1 is a schematic side view of an exemplary article 100 according to the present disclosure.

It should be understood that numerous other modifications and embodiments can be devised by those skilled in the art that fall within the scope and spirit of the principles of the disclosure. The FIGURES may not be drawn to scale.

DETAILED DESCRIPTION

Methods according to the present disclosure are suitable for practice with any transition metal oxide sol that has a pH of less than or equal to 3.5, preferably stabilized with a strong acid (e.g., nitric acid, sulfuric acid, or hydrochloric acid). Preferred transition metal oxides are those in Groups 3 and 4 and the Lanthanides (e.g., Y, Ti, Zr, Ce) of the Periodic Table of the Elements (IUPAC). Of these, zirconia sols and titania sols are most preferred.

Examples of commercially available acidic transition metal oxide sols having a pH of ≤3.5 include sols marketed by Nyacol Nanotechnologies, Ashland, Massachusetts, such a ceria sols (NYACOL CEO2(NO3) (pH=1.5, average particle diameter=10-20 nm, nitrate stabilized)), zirconia sols (NYACOL ZR 10/15 (average particle diameter=5-15 nm, pH=2.0-3.0, nitrate stabilized) (NYACOL ZR 100/20 (100 nm, pH 3.0, nitrate stabilized), and titania sols (e.g., NYACOL TISOL A (10-25 nm average particle diameter, nitric acid stabilized, pH 1.3-1.8), from Sakai Chemical Industry Co., Ltd., Osaka, Japan (e.g., CSB Anatase 100% (aqueous sol (nitric acidity pH<1), particle size 7 nm by XRD).

The transition metal oxide nanoparticles may have a volume average diameter of ≤100 nanometers (nm), ≤75 nm, ≤50 nm, ≤40 nm, ≤30 nm, ≤25 nm, or even ≤20 nm. Volume average nanoparticle diameter can be determine using known techniques such as, for example, ASTM E2490-09 (2015) "Standard Guide for Measurement of Particle Size Distribution of Nanomaterials in Suspension by Photon Correlation Spectroscopy (PCS)".

Useful carboxylic acids have the formula $R^1$—$CO_2H$, wherein $R^1$ is hydrocarbyl group having 6 to 30 carbon atoms, more preferably 8 to 18 carbon atoms, more preferably 9 to 16 carbon atoms, and more preferably 10 to 12 carbon atoms. The carboxylic acid(s) may be linear, branched, or cyclic, aromatic or aliphatic, and saturated or unsaturated. Specific examples include octanoic acid, nonanoic acid, decanoic acid, 2-ethylhexanoic acid, undecanoic acid, lauric acid, hexadecanoic acid, citronellic acid, stearic acid, tetracosanoic acid, and n-triacontanoic acid.

Useful organic amines have the formula $R^2R^3NH$, wherein $R^2$ represents a hydrocarbyl group having from 1 to 30 carbon atoms, preferably 6 to 18 carbon atoms, and more preferably 6 to 10 carbon atoms. Examples of $R^2$ include methyl, ethyl, propyl, butyl, n-hexyl, cyclohexyl, phenyl, benzyl, phenethyl, n-octyl, 2-ethylhexyl, n-decyl, n-dodecyl, n-tetradecyl, n-hexadecyl, n-octadecyl, n-eicosyl, n-tetracosyl, and n-triacontyl. $R^3$ represents H or an alkyl group having from 1 to 4 carbon atoms (e.g., methyl, ethyl, propyl, butyl). In some embodiments, the organic amine is represented by the formula $R^4CH_2NH_2$, wherein $R^4$ represents a hydrocarbyl group having from 1 to 29 carbon atoms. Aromatic amines may be especially desirable in some cases because of their relative higher refractive index that aliphatic amines.

The organic amine is added in sufficient amount to raise the pH to at least 5, thereby causing discrete separable (e.g., not a stable emulsion) aqueous and organic phases to form.

The use of an organic amine is important to the process. Many bases, and especially inorganic bases, interact with carboxylic acids to produce a surfactant that may stabilize an emulsion between the organic and aqueous phases. However, organic amines interact with carboxylic acids to produce a hydrophobic salt pair that is not an efficient emulsifier.

Exemplary solvents include: hydrocarbons such as pentane, hexane, heptane, octane, nonane, decane, toluene, xylenes, mineral spirits, and combinations thereof; chlorocarbons such as dichloromethane, chloroform, 1,2-dichloroethane, and combinations thereof; esters such as ethyl acetate, propyl acetate, butyl acetate, and combinations thereof; ketones such as methyl isobutyl ketone, and combinations thereof; ethers such as methyl t-butyl ether, diethyl ether, and combinations thereof; and combinations thereof.

In practice of methods according to the present disclosure, simple mixing procedures are effective to combine the transition metal oxide sol, the carboxylic acid, and the organic amine. In some cases, high shear mixing conditions are preferred. After mixing, the mixture is allowed to stand while the aqueous and organic phases separate. The organic phase can then be easily separated from the aqueous phase using conventional liquid extraction techniques and the organic solvent removed by heating and/or reduced pressure evaporation.

Generally, the above process results in transition metal oxide nanoparticles that have a residual amount of associated protonated form of the organic amine. Typically, these organoammonium cations are not harmful in end-use applications and can be left in combination with the transition metal oxide nanoparticles, which can be used without further purification, although in some cases further purification may be desirable. Purification methods may include centrifugation and tangential flow filtration, for example.

The transition metal oxide nanoparticles can be included in curable compositions comprising at least one curable monomer(s), optional curative, and optional solvent. Exemplary monomers include epoxides, (meth)acrylic monomers and oligomers, self-crosslinking latexes, cyanates, and urethanes (both 1- and 2-part). Of these, (meth)acrylic monomers and oligomers are especially useful. As used herein, the term "(meth)acryl" refers to acryl and/or methacryl. Selection of catalysts and/or initiators is within the capability of those having ordinary skill in the art.

Exemplary (meth)acrylic monomers and oligomers comprise at least one monomer comprising at least one (meth)acryl group. In many preferred embodiments, the at least one monomer comprises at least two or at least 3 monomers comprising at least one (meth)acryl group. In some embodiments, the at least one monomer comprises di-, tri-, tetra- and/or pentafunctional monomeric or oligomeric aliphatic, cycloaliphatic, and/or aromatic (meth)acrylate(s).

(Meth)acryl group-containing monomers are widely commercially available; for example, from Sartomer Co., Exton, Pennsylvania and other vendors. Suitable monomers may include mono-, di- or poly-(meth)acrylates such as, for example, (meth)acrylic acid, 2-(2-ethoxyethoxy)ethyl (meth)acrylate, 2-ethylhexyl (meth)acrylate, 2-hydroxyethyl (meth)acrylate, alkoxylated tetrahydrofurfuryl (meth)acrylate, allyl (meth)acrylate, bis[1-(2-acryloxy)]-p-ethoxyphe-nyldimethylmethane, bis[1-(3-acryloxy-2-hydroxy)]-p-propoxyphenyldimethylmethane, bis(trimethylolpropane) tetraacrylate, chlorinated polyester (meth)acrylates, diethyl-ene glycol di(meth)acrylate, diglycidyl (meth)acrylate of bisphenol A, dodecyl (meth)acrylate, epoxy (meth)acrylate oligomers, ethoxylated or propoxylated glycerol tri(meth) acrylate, ethyl (meth)acrylate, ethylene glycol di(meth)acry-late, glycerol di(meth)acrylate, glycerol tri(meth)acrylate, hexanediol di(meth)acrylate, hexyl (meth)acrylate, hydroxybutyl (meth)acrylate, hydroxy-functional caprolac-tone ester (meth)acrylate, hydroxyisopropyl (meth)acrylate, hydroxymethyl (meth)acrylate, hydroxypropyl (meth)acry-late, isobornyl (meth)acrylate, isobutyl (meth)acrylate, iso-decyl (meth)acrylate, isononyl (meth)acrylate, isooctyl (meth)acrylate, isopropyl (meth)acrylate, lauryl (meth)acry-late, methyl (meth)acrylate, n-butyl (meth)acrylate, neopen-tyl glycol di(meth)acrylate, n-hexyl (meth)acrylate, non-ylphenol ethoxylate (meth)acrylate, octyl (meth)acrylate, pentaerythritol tetra(meth)acrylate, pentaerythritol triacry-late, poly(ethylene glycol) di(meth)acrylates, polybutadiene di(meth)acrylates, polyester (meth)acrylate oligomers, poly-urethane di(meth)acrylates, silicone (meth)acrylate oligom-ers, sorbitol hexaacrylate, stearyl (meth)acrylate, tetraethyl-ene glycol di(meth)acrylate, tetrahydrofurfuryl (meth) acrylate, triethylene glycol di(meth)acrylate, tris (hydroxyethyl) isocyanurate tri(meth)acrylate, β-carboxyethyl (meth)acrylate, 1,1,1-trimethylolpropane tri (meth)acrylate, 1,2,4-butanetriol tri(meth)acrylate, hexane-2,4,6-triol tri(meth)acrylate, 1,3-propanediol di(meth)acry-late, 1,4-cyclohexanediol diacrylate, 1,6-hexanediol di(meth)acrylate, 1,12-dodecanediol di(meth)acrylate, (meth)acrylamide, N,N-dimethyl(meth)acrylamide, and combinations thereof.

The (meth)acrylic monomer may be present in the com-position in an amount of at least 20, at least 30, at least 50, at least 70, at least 80, at least 90, at least 95, or even at least 98 percent by weight, based on the total weight of the composition, although this is not a requirement.

Exemplary free-radical initiators include thermal initia-tors such as peroxides (e.g., benzoyl peroxide) and azo compounds (e.g., azobisisobutyronitrile) and photoinitiators (e.g., Type I and/or Type II photoinitiators), typically in an amount of less than about 10 percent by weight, more typically less than 5 percent by weight, although this is not a requirement.

Exemplary photoinitiators include α-cleavage photoini-tiators such as benzoin and its derivatives such as α-meth-ylbenzoin; α-phenylbenzoin; α-allylbenzoin; α-benzylben-zoin; benzoin ethers such as benzil dimethyl ketal (available as IRGACURE 651 from Ciba Specialty Chemicals, Tarry-town, New York), benzoin methyl ether, benzoin ethyl ether, benzoin n-butyl ether; acetophenone and its derivatives such as 2-hydroxy-2-methyl-1-phenyl-1-propanone, and 1-hy-droxycyclohexyl phenyl ketone. One useful photoinitiator, a difunctional α-hydroxyketone, is available as ESACURE ONE from IGM Resins, Waalwijk, The Netherlands. Other exemplary photoinitiators include: anthraquinones (e.g., anthraquinone, 2-ethylanthraquinone, 1-chloroanthraqui-none, 1,4-dimethylanthraquinone, 1-methoxyanthraqui-none) and benzophenone and its derivatives (e.g., phenoxy-benzophenone, phenylbenzophenone).

Curing may be accomplished/accelerated by heating (e.g., in an oven or by exposure to infrared radiation) and/or exposure to actinic radiation (e.g., ultraviolet and/or elec-tromagnetic visible radiation), for example. Selection of sources of actinic radiation (e.g., xenon flash lamp, medium pressure mercury arc lamp) and exposure conditions is within the capability of those having ordinary skill in the art.

Referring now to FIG. 1, exemplary article 100 comprises substrate 110. Layer 120 is disposed on substrate 110. Layer 120 comprises at least partially cured curable composition according to the present disclosure. Exemplary substrates may include optical films (e.g., privacy films, brightness enhancement films, mirror films, light extraction films) and display elements (OLED displays).

The article can be prepared by coating (e.g., by roll coating, knife coating, spraying, or dip coating) a curable composition according to the present disclosure onto the substrate and curing it (e.g., with heat and/or actinic radia-tion).

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Materials Used in the Examples as reported in Table 1, below.

TABLE 1

| ABBREVIATION | DESCRIPTION |
| --- | --- |
| NTB-01 | Dispersion of 15.0 weight percent (wt. %) titania nanoparticles in water, obtained from Showa Denko (Tokyo, Japan). The particles have an average diameter less than 50 nm and are stabilized with hydrochloric acid. |
| TISOL-A | Dispersion of 16.9 wt. % titania nanoparticles in water obtained from Nyacol (Ashland, Massachusetts). The particles have an average diameter of 20 nm and are stabilized with nitric acid. |
| ZR100/20 | Dispersion of 17.6 wt. % zirconia nanoparticles in water obtained from Nyacol. The particles have an average diameter of 100 nm and are stabilized with nitric acid. |
| M1192 | 4-Phenylbenzyl acrylate sold as Miramer M1192, obtained from Miwon Specialty Chemical Company, Ltd., South Korea. |
| IBA | Isobornyl acrylate sold as SR 506A by Sartomer (subsidiary of Arkema Group, Colombes, France). |
| TCDDMDA | Tricyclo[5.2.1.0$^{2,6}$]decanedimethanol diacrylate, obtained as SR833s from Sartomer. |

TABLE 1-continued

| ABBREVIATION | DESCRIPTION |
|---|---|
| HDDA | Refers to 1,6-hexanediol diacrylate sold as SR 238 obtained from Sartomer. |
| TPO | Refers to Irgacure TPO photoinitiator obtained from BASF (Ludwigshafen, Germany). |
| Citronellic acid solution | Citronellic acid was obtained from Alfa Aesar (Tewksbury, MA). It was dissolved in toluene at a concentration of 1.00 mmoles per gram (mmol/g). |
| Benzylamine solution | Benzyl amine was obtained from Alfa Aesar and was dissolved in toluene at a concentration of 1.00 mmol/g. |
| Lauric acid solution | Lauric acid was obtained from Alfa Aesar and was dissolved in heptane at a concentration of 1.00 mmol/g. |
| BYK 9010 | Refers to a wetting and dispersing additive sold by BYK Additives and Instruments (Wesel, Germany). |

Other solvents and chemicals were obtained from Alfa Aesar (Tewksbury, Massachusetts), and were used as received.

Test Method 1: Measurement of Transmittance and Haze of Coated Films

Total transmittance and haze measurements were made using a BYK Haze-Gard Plus, Model No. 4725 (BYK-Gardner USA, Columbia, Maryland), an integrating sphere instrument having 0°/diffuse geometry and CIE standard illuminant C. Samples were placed directly at the haze port for measurement of transmittance and haze. Reported values are an average of three measurements.

Test Method 2: Refractive Index Measurement of Film Coatings

Refractive indices of the coated films at three wavelengths were measured using a Metricon Prism Coupler (Metricon Corp.—Pennington, N.J.).

Example 1: Extraction of NTB-01 TiO$_2$ Nanoparticles into Toluene

A vial was charged with 4.0 g of NTB-01 nanoparticle sol, 2.0 g of water, 5.0 g of toluene, 900 mg of citronellic acid solution, and 1.35 g of benzylamine solution. Capped the vial and mixed on a vortex mixer. The layers were allowed to separate, then the lower, clear aqueous layer was removed by pipette. BYK 9010 (20 mg) was added and the mixture was allowed to stand for 20 minutes. Anhydrous sodium sulfate (0.5 g) was added followed by mixing again with a vortex mixer. The mixture was filtered through a one-micron glass fiber syringe-tip filter. A white dispersion (6.86 g) was obtained. A small aliquot of this dispersion was evaporated to dryness, and the change in mass was used to estimate the percent solids as 8.79 wt. %, which implies a yield of 603 mg of particles.

Example 2: Extraction of TISOL-A into Toluene

A separatory funnel was charged with 150.0 g of TISOL-A nanoparticle sol, 150 g of water, 250 g of toluene, 4.75 g of citronellic acid, and 10.7 g of benzylamine. The mixture was stirred rapidly with an overhead stirrer for five minutes, which caused the formation of a white emulsion. After standing for 30 minutes, the emulsion separated into two distinct layers. The aqueous layer was discarded, and the organic layer was treated with 5.0 g of anhydrous sodium sulfate, then filtered through a one-micron glass fiber syringe-tip filter. A hazy opalescent dispersion (232 g) was obtained. A small aliquot of this dispersion was evaporated to dryness, and the change in mass was used to estimate the percent solids as 12.6 wt. %, which implies a yield of 29.1 g of particles.

Example 3: Extraction of TISOL-A into Heptane

A vial was charged with 2.0 g of TISOL A nanoparticle sol, 3.0 g of water, 5.0 g of heptane, 550 mg of lauric acid solution, and 120 mg of benzylamine. The vial was capped and mixed on a vortex mixer. The layers were allowed to separate, then the lower, clear aqueous layer was removed by pipette. BYK 9010 (10 mg) was added, and the mixture was allowed to stand for 20 minutes. Anhydrous sodium sulfate (0.5 g) was added followed by mixing again with a vortex mixer. The mixture was filtered through a one-micron glass fiber syringe-tip filter. A hazy opalescent dispersion (5.6 g) was obtained. A small aliquot of this dispersion was evaporated to dryness, and the change in mass was used to estimate the percent solids as 7.10 wt. %, which implies a yield of 400 mg of particles.

Example 4: Extraction of ZR100/20 into Toluene

A vial was charged with 4.0 g of ZR100/20 nanoparticle sol, 4.0 g of water, 8.0 g of toluene, 700 mg of citronellic acid solution, and 320 mg of benzylamine. The vial was capped and mixed on a vortex mixer. The layers were allowed to separate, then the lower, clear aqueous layer was removed by pipette. Anhydrous sodium sulfate (0.5 g) was added followed by mixing with a vortex mixer. The mixture was filtered through a one-micron glass fiber syringe-tip filter. A white dispersion (8.26 g) was obtained. A small aliquot of this dispersion was evaporated to dryness, and the change in mass was used to estimate the percent solids as 6.17 wt. %, which implies a yield of 510 mg of particles.

Example 5: Coating Using TiO$_2$ Particles Dispersed in Toluene

A vial was charged with 3.0 g of the nanoparticle dispersion of Example 1, and 465 mg of a solution of 10 wt. % acrylates dissolved in toluene was added. The acrylates portion of this solution consisted of a 9:1 mixture of M1192: TCDDMDA. A 10 wt. % solution of TPO in toluene (71 mg) was added. This solution was coated onto 2 mil (0.05 mm) thick polyethylene terephthalate (PET) film using a #12 wire wound rod obtained from BYK. After solvent evaporation, the coating was cured with a high intensity ultraviolet lamp using a benchtop conveyor system obtained from Heraeus (Hanau, Germany). The system was purged with nitrogen gas, and the coating was cured using a D bulb at 100% power while running the conveyor belt at 30 feet per minute. The coating was passed through the system three times.

Example 6: Coating Using TiO$_2$ Particles Dispersed in Toluene

A vial was charged with 3.02 g of the nanoparticle dispersion of Example 2, 76 mg of a solution of 10 wt. % BYK 9010 in toluene, and 683 mg of a solution of 10 wt. % acrylates dissolved in toluene. The acrylates portion of this solution consisted of a 9:1 by mass mixture of M1192: TCDDMDA. A 10 wt. % solution of TPO in toluene (91 mg) was added. This solution was coated onto 2 mil (0.05 mm) thick polyethylene terephthalate (PET) film using a #12 wire wound rod obtained from BYK. After solvent evaporation, the coating was cured with a high intensity UV lamp using the method described for Example 5.

Example 7: Coating Using TiO$_2$ Particles Dispersed in Heptane

A vial was charged with 3.0 g of the nanoparticle dispersion of Example 3 and 408 mg of a solution of 10 wt. % acrylates dissolved in heptane. The acrylates portion of this solution consisted of a 9:1 by mass mixture of IBA:HDDA. A 10 wt. % solution of TPO in toluene (69 mg) was added. This solution was coated onto 2 mil (0.05 mm) thick polyethylene terephthalate (PET) film using a #12 wire wound rod obtained from BYK. After solvent evaporation, the coating was cured with a high intensity UV lamp using the method described for Example 5.

Example 8: Coating Using ZrO$_2$ Particles Dispersed in Toluene

A vial was charged with 2.0 g of the nanoparticle dispersion of Example 4, 25 mg of a solution of 10 wt. % BYK 9010 in toluene, and 222 mg of a solution of 10 wt. % acrylates dissolved in toluene. The acrylates portion of this solution consisted of a 9:1 by mass mixture of M1192: TCDDMDA. A 10 wt. % solution of TPO in toluene (30 mg) was added. This solution was coated onto 2 mil (0.05 mm) thick polyethylene terephthalate (PET) film using a #12 wire wound rod obtained from BYK. After solvent evaporation, the coating was cured with a high intensity UV lamp using the method described for Example 5.

Comparative Example 1: Nanoparticle-Free UV-Cured Coating

A vial was charged with 2.0 g of a solution of 10% acrylates in toluene. The acrylates portion of this solution consisted of a 9:1 by mass mixture of M1192:TCDDMDA. A 10 wt. % solution of TPO in toluene (40 mg) was added. The solution was coated onto 2 mil (0.05 mm) thick polyethylene terephthalate (PET) film using a #12 wire wound rod obtained from BYK. After solvent evaporation, the coating was cured with a high intensity UV lamp using the method described for Example 5.

Table 2, below, reports optical Properties of Coatings made in Examples 5 to 8 and Comparative Example 1.

TABLE 2

|  | % TRANSMISSION | % HAZE |
|---|---|---|
| EXAMPLE 5 | 85.8 | 2.45 |
| EXAMPLE 6 | 86.5 | 1.88 |
| EXAMPLE 7 | 88.3 | 2.35 |
| EXAMPLE 8 | 89.6 | 4.42 |
| COMPARATIVE EXAMPLE 1 | 89.9 | 1.29 |
| Uncoated PET substrate | 92.0 | 1.19 |

Table 3, below, reports the RI of coatings made in Examples 5-8 and Comparative Examples 1 and 2.

TABLE 3

|  | RI at 409 nm | RI at 532 nm | RI at 636 nm |
|---|---|---|---|
| EXAMPLE 5 | 1.996 | 1.887 | 1.860 |
| EXAMPLE 6 | 1.942 | 1.851 | 1.820 |
| EXAMPLE 7 | 1.821 | 1.727 | 1.626 |
| EXAMPLE 8 | 1.715 | 1.640 | 1.630 |
| COMPARATIVE EXAMPLE 1 | 1.669 | 1.632 | 1.613 |

The preceding description, given in order to enable one of ordinary skill in the art to practice the claimed disclosure, is not to be construed as limiting the scope of the disclosure, which is defined by the claims and all equivalents thereto.

What is claimed is:

1. A method of making surface-functionalized transition metal oxide nanoparticles, the method comprising:

providing a sol comprising transition metal oxide nanoparticles dispersed in an aqueous liquid medium having a pH of less than or equal to 3.5 and stabilized with at least one mineral acid;

combining the sol with an extractant composition comprising at least one carboxylic acid and at least one organic amine, and a water-immiscible organic solvent, wherein:

each one of the at least one carboxylic acid is independently represented by the formula R$^1$—CO$_2$H, wherein R$^1$ is a hydrocarbyl group having from 10 to 12 carbon atoms; and each one of the at least one organic amine is represented by the formula R$^2$R$^3$NH, wherein R$^2$ is a hydrocarbyl group having from 6 to 30 carbon atoms, and R$^3$ is H or an alkyl group having from 1 to 4 carbon atoms, and wherein the at least one organic amine is present in at least an amount sufficient to neutralize acid present in the sol, thereby forming discrete separable aqueous and organic phases; and separating at least a portion of the organic phase from the aqueous phase and then at least partially removing the water-immiscible organic solvent from the separated organic phase to obtain at least a portion of the surface-functionalized transition metal oxide nanoparticles.

2. The method of claim 1, wherein the transition metal oxide nanoparticles comprise at least one of titanium oxide, zirconium oxide, or cerium oxide.

3. The method of claim 1, wherein the transition metal oxide nanoparticles comprise a titanium oxide.

4. The method of claim 1, wherein R$^2$ represents a hydrocarbyl group having 6 to 18 carbon atoms.

5. The method of claim 1, wherein R$^2$ represents a hydrocarbyl group having 7 to 10 carbon atoms.

6. The method of claim 1, wherein $R^3$ is H.

7. The method of claim 1, wherein the at least one organic amine comprises at least one of benzylamine, n-octylamine, or 2-ethylhexylamine.

8. The method of claim 1, wherein the at least one organic amine comprises benzylamine.

9. The method of claim 1, wherein the transition metal oxide nanoparticles have an average particle diameter of less than or equal to 100 nanometers.

10. The method of claim 1, wherein the transition metal oxide nanoparticles have an average particle diameter of less than or equal to 40 nanometers.

11. A method of making surface-functionalized transition metal oxide nanoparticles, the method comprising:

providing a sol comprising transition metal oxide nanoparticles dispersed in an aqueous liquid medium having a pH of less than or equal to 3.5 and stabilized with at least one mineral acid;

combining the sol with an extractant composition comprising at least one carboxylic acid and benzylamine, and a water-immiscible organic solvent, wherein:

each one of the at least one carboxylic acid is independently represented by the formula $R^1$—$CO_2H$, wherein $R^1$ is a hydrocarbyl group having from 6 to 30 carbon atoms; and the benzylamine is present in at least an amount sufficient to neutralize acid present in the sol, thereby forming discrete separable aqueous and organic phases; and separating at least a portion of the organic phase from the aqueous phase and then at least partially removing the water-immiscible organic solvent from the separated organic phase to obtain at least a portion of the surface-functionalized transition metal oxide nanoparticles.

12. The method of claim 11, wherein the transition metal oxide nanoparticles comprise at least one of titanium oxide, zirconium oxide, or cerium oxide.

13. The method of claim 11, wherein the transition metal oxide nanoparticles comprise a titanium oxide.

14. The method of claim 11, wherein R1 represents a hydrocarbyl group having 8 to 18 carbon atoms.

15. The method of claim 11, wherein R1 represents a hydrocarbyl group having 10 to 12 carbon atoms.

16. The method of claim 11, wherein $R^2$ represents a hydrocarbyl group having 6 to 18 carbon atoms.

17. The method of claim 11, wherein $R^2$ represents a hydrocarbyl group having 5 to 8 carbon atoms.

18. The method of claim 11, wherein the transition metal oxide nanoparticles have an average particle diameter of less than or equal to 100 nanometers.

19. The method of claim 11, wherein the transition metal oxide nanoparticles have an average particle diameter of less than or equal to 40 nanometers.

* * * * *